United States Patent [19]

Schietinger et al.

[11] Patent Number: 5,154,512
[45] Date of Patent: Oct. 13, 1992

[54] NON-CONTACT TECHNIQUES FOR MEASURING TEMPERATURE OR RADIATION-HEATED OBJECTS

[75] Inventors: Charles W. Schietinger; Bruce E. Adams, both of Portland, Oreg.

[73] Assignee: Luxtron Corporation, Santa Clara, Calif.

[21] Appl. No.: 507,605

[22] Filed: Apr. 10, 1990

[51] Int. Cl.$^5$ .............. G01J 5/10; G01N 25/20; H05B 3/62

[52] U.S. Cl. .................. 374/9; 250/227.14; 374/32; 374/126; 374/129; 374/131; 392/416

[58] Field of Search .......... 374/131, 130, 9, 126, 374/128, 132; 350/96.14, 96.29, 1.5, 1.6; 219/405, 492.1, 504; 250/338.1, 342, 341; 364/557; 324/158 R; 356/45; 73/865.9; 359/350, 359; 362/804; 392/416

[56] References Cited

U.S. PATENT DOCUMENTS

| | | | |
|---|---|---|---|
| 2,709,367 | 5/1955 | Bohnet | 374/131 |
| 3,288,625 | 11/1966 | Kauer | 350/1.5 X |
| 3,586,851 | 6/1971 | Rudolph | 362/268 X |
| 3,686,940 | 8/1972 | Kockott | 350/1.5 X |
| 3,971,939 | 7/1976 | Andressen | 250/339 |
| 4,101,759 | 7/1978 | Anthony et al. | 219/405 X |
| 4,222,663 | 9/1980 | Gebhart et al. | 356/45 |
| 4,236,075 | 11/1980 | Nexo et al. | 350/318 X |
| 4,254,455 | 3/1981 | Neal, Jr. | 362/804 X |
| 4,408,827 | 10/1983 | Guthrie et al. | 374/131 X |
| 4,540,293 | 9/1985 | Shores | 374/131 X |
| 4,576,486 | 3/1986 | Dils | 374/131 |
| 4,579,461 | 4/1986 | Rudolph | 374/126 |
| 4,579,463 | 4/1986 | Rosencwaig et al. | 374/130 X |
| 4,632,908 | 12/1986 | Schultz | 374/130 |
| 4,745,291 | 5/1988 | Niiya | 250/341 X |
| 4,752,127 | 6/1988 | Zafred | 250/341 X |
| 4,799,787 | 1/1989 | Mason | 374/131 X |
| 4,850,661 | 7/1989 | Kawakatsu | 359/359 |
| 4,865,405 | 9/1989 | Kageyama | 350/1.6 |
| 4,896,928 | 1/1990 | Perilloux et al. | 359/359 |
| 4,919,542 | 4/1990 | Nulman et al. | 374/9 |
| 4,979,134 | 12/1990 | Arima et al. | 364/557 |
| 4,983,001 | 1/1991 | Hagiuda et al. | 359/584 |

FOREIGN PATENT DOCUMENTS

57-30916 2/1982 Japan ................. 374/9

OTHER PUBLICATIONS

"New Ways To Improve RTP Through Optical Fiber Thermometry", Accufiber, Inc., dated Apr. 11, 1989, six pages, (2nd Copy, see Paper No. 9), (6 pages).
Stultz, "Rapid Thermal Processing: Equipment Issues for High Volume Production Environments", Peak Systems, Inc., Fremont, Calif., no known date, Four (4) pages.
Gelpey et al., "Process Control for a Rapid Optical Annealing System", Mat. Res. Soc. Symp. Proc., 1985, pp. 199-207, Nine (9) pages.
Kato and Iwamatsu, "Rapid Annealing Using Halogen Lamps", J. Electrochem. Soc.: Solid State Science and Technology, vol. 131, No. 5, May 1984, pp. 1145-1152.
Pettibone et al., "The Effect of Thin Dielectric Films on the Accuracy of Pyrometric Temperature Measurement", Mat. Res. Soc. Symp. Proc., vol. 52, 1986, pp. 209-216.
Singer, "Will RTP Emerge as the Cinderella Technology of the '90s?", Semiconductor International, Mar. 1989, pp. 76-80.

Primary Examiner—Daniel M. Yasich
Attorney, Agent, or Firm—Majestic, Parsons, Siebert & Hsue

[57] ABSTRACT

A non-contact pyrometric technique is provided for measuring the temperature and/or emissivity of an object that is being heated by electromagnetic radiation within the optical range. The measurement is made at short wavelengths for the best results. The measurement may be made at wavelengths within those of the heating optical radiation, and the resulting potential error from detecting heating radiation reflected from the object is avoided by one of two specific techniques. A first technique utilizes a mirror positioned between the heating lamps and the object, the mirror reflecting a narrow wavelength band of radiation in which the optical pyrometer detector operates. The second technique is to independently measure the a.c. ripple of the heating lamp radiation and subtract the background optical noise from the detected object signal in order to determine temperature and emissivity of the object. Both of these techniques can be combined, if desired.

32 Claims, 3 Drawing Sheets

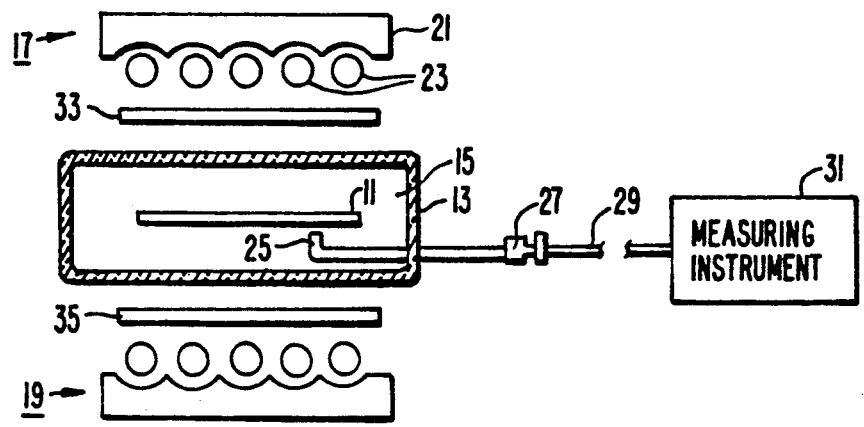
FIG._1.
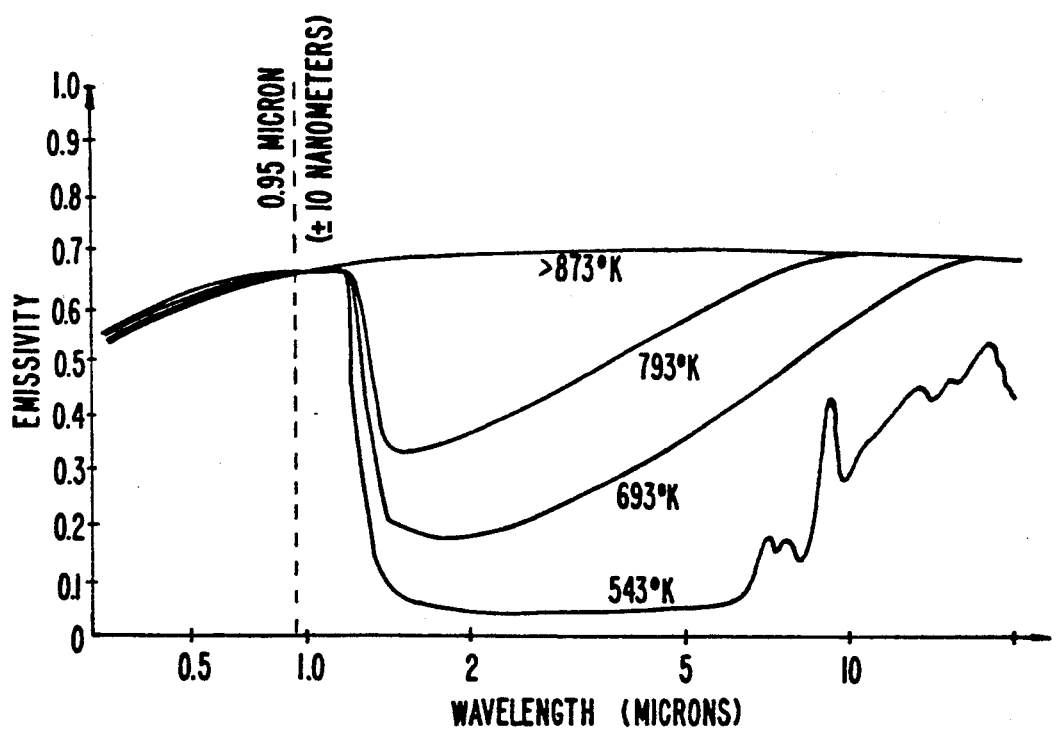
FIG._2.

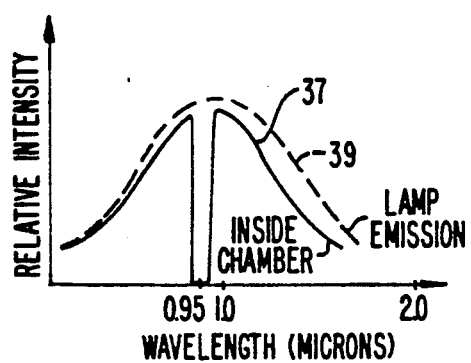
FIG._3.
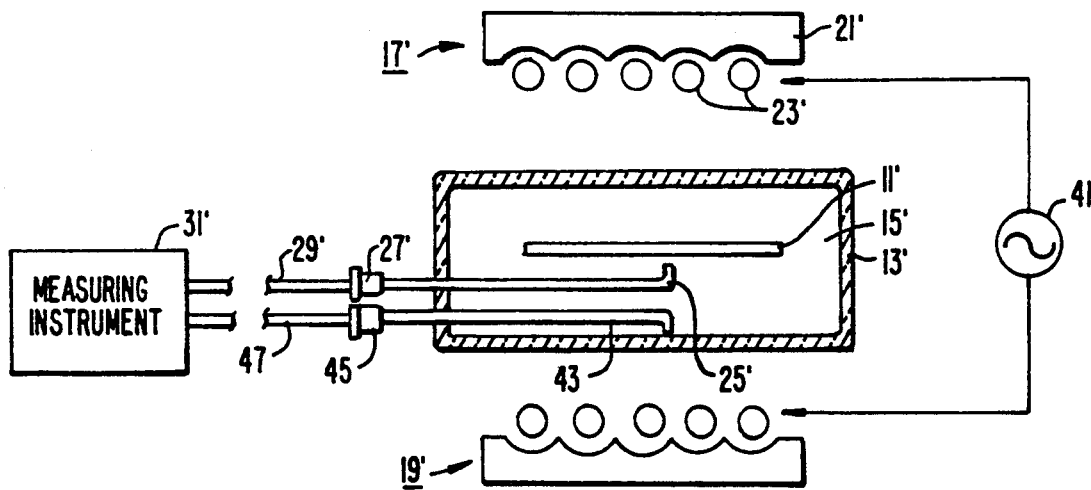
FIG._4.

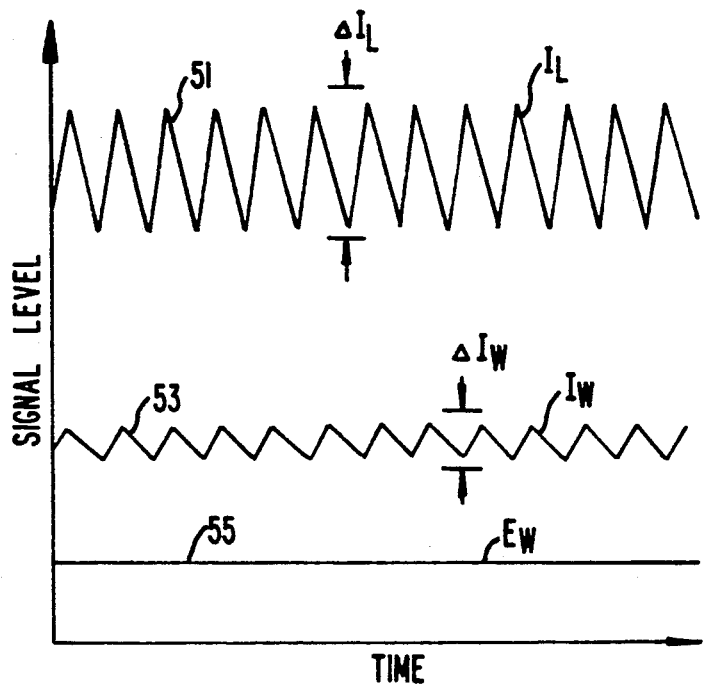
FIG._5.
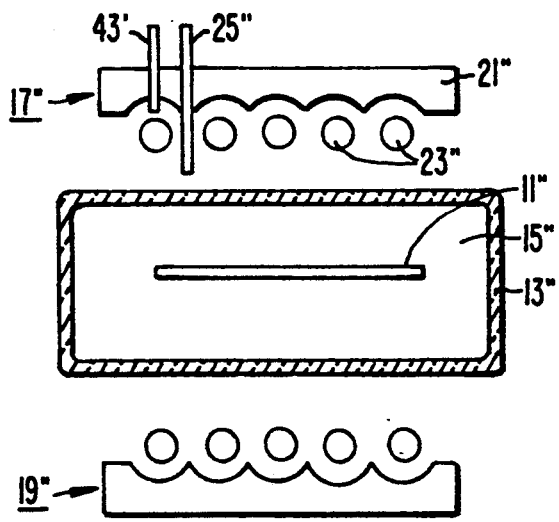
FIG._6.

NON-CONTACT TECHNIQUES FOR MEASURING TEMPERATURE OR RADIATION-HEATED OBJECTS

BACKGROUND OF THE INVENTION

This invention is related generally to temperature and emissivity measurement, and more specifically, to the measurement by pyrometric techniques of high processing temperatures of objects heated by electromagnetic radiation within the visible, infrared or other near-visible wavelength range.

There are many examples of the application of optical heating techniques. One example is in heating materials for the purpose of testing them. Another is in the heat treatment of an object. A further example of is found in the semiconductor processing industry. In this latter example, silicon wafers to be processed are positioned within an enclosed chamber made, at least partially, of an optically transparent material. Lamps outside the chamber direct a large amount of energy through its transparent walls and onto the wafer. The wafer is heated as a result of its absorption of the optical radiation. Generally, the chamber is formed of a quartz envelope, or of stainless steel with an optical window. The heated wafer is treated by introducing appropriate gases into the chamber which react with the heated surface of the wafer.

These processes require that the temperature of the wafer be maintained within narrow limits in order to obtain good processing results. Therefore, some technique of monitoring the temperature of the wafer is required. One possibility is to contact the wafer with a conventional thermocouple, but this is precluded by poor measurement and contamination considerations when semiconductor wafers are the objects being heated. For other types of objects, such contact measurement techniques most often are precluded because of a number of practical considerations. The technique also often results in substantial errors because of a differing thermal mass, poor thermal contact and a difference in emittance between the thermocouple and the object being heated.

As a result, most optical heating applications use some form of a long wavelength pyrometer. This technique measures the intensity of the radiation of the semiconductor wafer or other optically heated object within a narrow wavelength band. That radiation intensity is then correlated with temperature of the object. In order to avoid errors by the pyrometer receiving heating optical radiation reflected from the object being heated, the wavelength chosen for monitoring by the pyrometer is outside of the emission spectrum of heating lamps. This detected wavelength range is generally made to be significantly longer than the spectrum of the lamps.

There are several disadvantages to such existing pyrometric systems. First, a measurement made at a longer wavelength will have only a portion of the sensitivity of one made at a shorter wavelength. Second, the emissivity of silicon and other materials that are optically heated is dependent upon the wavelength at which it is measured. Third, the photodetectors with the highest signal-to-noise ratio are those which respond to the shorter wavelength emissions. Fourth, existing optical pyrometers have a small numerical aperture and thus provide temperature measurements which are also dependent upon the degree of roughness of the object and film growth being measured. Fifth, existing pyrometric techniques are slow, a significant disadvantage in a rapid heating system.

It is a primary object of the present invention to provide an improved pyrometric technique of temperature and/or emissivity measurements that overcomes these shortcomings.

SUMMARY OF THE INVENTION

This and additional objects are achieved by the present invention which allows measurement of object temperature and/or emissivity by monitoring its radiation emission at short wavelengths, even if in a bandwidth that is coincident with that of the strong optical radiation source that is heating the object. According to one aspect of the present invention, this is accomplished by positioning a mirror between the lamps and the object that reflects back toward the lamps a narrow wavelength band, thereby eliminating this band of light from the chamber. A lightpipe then collects only the object's emission light within this reflected band. According to a second aspect of the present invention, the optical radiation of the alternating current driven heating lamps is monitored simultaneously with monitoring the light from the object in order to develop a measured value proportional to the light being reflected by the object, thereby allowing the object-reflected light to be subtracted from the total signal. Either case overcomes the natural effect of the heating light source to overwhelm the temperature signal being obtained by monitoring object emissions within the wavelengths of the heating lamps. These two aspects of the invention can be utilized separately or together.

Additional objects, advantages and features of the present invention will become apparent from the following description of its preferred embodiments, which description should be taken in conjunction with the accompanying drawings.

BRIEF DESCRIPTION OF THE DRAWINGS

FIG. 1 illustrates one embodiment of the present invention according to a first aspect;

FIGS. 2 and 3 each show curves of operation of the embodiment of FIG. 1;

FIG. 4 illustrates one embodiment of the present invention according to a second aspect;

FIG. 5 are curves which show the operation of the embodiment of FIG. 4; and

FIG. 6 shows a modification of the embodiment of FIGS. 4.

DESCRIPTION OF THE PREFERRED EMBODIMENTS

Although the embodiments of the invention to be described can be applied to the measurement of the temperature of almost any optically heated object, an example of heating a semiconductor wafer during integrated circuit processing is utilized since this is an important application. Referring to FIG. 1, such an semiconductor wafer 11 is schematically shown to be enclosed within a quartz furnace or processing chamber 13. Mechanical supports for the wafer 11, sources of processing gases into a chamber 15 in which the wafer 11 is positioned, and other equipment required for processing are omitted for simplicity.

The wafer 11 is heated by banks 17 and 19 of lamps positioned, in one example, on opposite sides of the wafer 11. Each bank of lights includes a reflector 21 and plurality of quartz lamps 23, for example, in the light bank 17. In order to measure the temperature of the wafer 11, a portion of its temperature-dependent emission is gathered by a bent lightpipe 25 that is able to withstand the temperatures within and near the quartz enclosure 13. At a suitable distance from that enclosure, the lightpipe 25 is connected by a coupler 27 to a suitable optical fiber 29. The optical fiber 29 carries the emission signal to a measuring instrument 31, where it is detected, electronically processed, and correlated with temperature.

If the heating light bank 19 is not utilized, as is sometimes the case, or if a single more powerful lamp is used, the method is the same except for the specific geometry. Others have generally tended to measure the emission of the object 11 in an optical wavelength band that is outside of the emission band of the lamps 23, in order to avoid the effect of strong optical lamp noise. But the techniques of the present invention allow the measurement to take place in a wavelength band that is near the wavelength of the peak intensity of the lamp 23 and take advantage of the wavelength regions which have high sensitivity and good emissivity for pyrometric measurements.

The embodiment of FIG. 1 allows this overlapping operation by the provision of highly tuned mirrors 33 and 35 positioned in front of each of the light banks 17 and 19, respectively. These mirrors are chosen to have a narrow, sharp reflection bandwidth centered around the photo-detector's wavelength sensitivity. A specific example of a "notch" in the lamp emission wavelengths caused by the mirrors is indicated by a curve 37 of FIG. 3. The emission wavelengths of the lamps are indicated by a curve 39. In this specific example, a silicon detector within the measuring instrument 31 is provided to monitor the emission from the object 11 at a very narrow wavelength around 0.95 microns. Thus, the mirrors 33 and 35 are each provided to reflect light from the lamps within a bandwidth, in this example, that is ±10 nanometers from the 0.95 micron center wavelength. Light within that bandwidth is not allowed to enter the chamber 15 from the lamps. By reflecting the light in this narrow band, rather than absorbing it, overheating of the mirrors 33 and 35 is avoided. The structure of each of these mirrors is preferably a multi-layered mirror of a type used with high powers lasers.

Referring to FIG. 2, an advantage of the present invention is illustrated by some example emissivity curves for pure silicon, similar to that of the semiconductor wafers 11 that are radiantly heated. The curves of FIG. 2 show an emissivity that varies significantly as a function of temperature in wavelengths longer than one micron. Measurements within this range are difficult to make because of the varying emissivity as a function of the object's temperature. Even so, others using pyrometric techniques for optically heated objects operate within a band around 4, 5 or more microns in order to avoid any overlap with the heating lamp spectra. However, this source of error is eliminated by the techniques of the present invention wherein the capability is provided for measuring temperature by monitoring the object's emission in a wavelength band shorter than one micron.

In a preferred implementation of the embodiment of FIG. 1, the lightpipe 25 is made of sapphire. Because of its refractive index, a sapphire lightpipe 25 has large numerical aperture (angle of acceptance) of radiation from the surface of the heated object 11. In addition to its good optical characteristics, sapphire is able to withstand the high temperatures within the chamber 15. Cubic zirconia also has these desirable characteristics. The measuring instrument 31 is preferably a commercially available model 100 of the Accufiber division of Luxtron Corporation, Beaverton, Oregon.

A second embodiment of the present invention is illustrated in FIG. 4. Structural elements of FIG. 4 that correspond to those of the embodiment of FIG. 1 are given the same reference number but with a prime (') added. An electrical power supply 41 is also indicated for driving the heating lamps of each of the light banks 17' and 19'. These lamps are driven with an alternating current at the power distribution line frequency, 60 Hz., for the United States, and 50 Hz. in Europe.

The embodiment of FIG. 4 provides no mirrors or optical filters between the light banks and the object 11' being heated. Therefore, the lightpipe 25' will receive a signal that is composed of both reflected lamp light and object emitted light. In this embodiment, the lamp output is measured without contribution of emission from the object 11' and a signal develops which is then subtracted from the signal from the lightpipe 25' in order to eliminate the effect of the source reflectance from that signal. A second lightpipe 43 is provided within the chamber 15' but faces downward toward the lamps of the light bank 19'. The optical signal in the lightpipe 43 is connected by a coupler 45 to a standard optical fiber 47. The light signals within the optical fibers 29' and 47 are detected by the same type of detectors within a measuring instrument 31'. The electrical signal outputs of these detectors are then processed in a way to subtract the effect of the heating lamps out of the signal gathered by the lightpipe 25'. Alternatively, a single lightpipe and detector can be provided where the lightpipe is rotated between positions facing the object and the lamps.

This processing is illustrated by the curves of FIG. 5. A curve 51 shows the signal level output of the detector receiving the optical signal of the lamps alone through the lightpipe 43. Similarly, a curve 53 illustrates the output of the detector receiving the combined object emission and heating light source reflection received by the lightpipe 25'. The a.c. component (nipple) of the signal 51 is indicated by $\Delta I_L$, and the a.c. component, of the signal 53 is denoted by $\Delta I_w$. The curves of FIG. 5 also show a steady state signal 55 that is proportional to the emission of the object 11' ($E_w$), which can be derived by processing within the instrument 31 of the signals 51 and 53.

Because the lightpipes 25' and 43, are selected to have a very large numerical aperture, the following relationship is true:

$$\text{Wafer Reflectivity} = \frac{\Delta I_W}{\Delta I_L} \qquad (1)$$

Since we also know that, under certain conditions, emissivity of an object equals one minus its reflectivity, we can state that:

$$\text{Emissivity} = 1 - \frac{\Delta I_W}{\Delta I_L} \qquad (2)$$

Equation (2) provides a measurement of the emissivity of the object. If its temperature is to be measured, the reflected component of $I_w$ can then be subtracted away, leaving the object emission signal alone, as follows:

$$E_W = I_W - I_L \left( \frac{\Delta I_W}{\Delta I_L} \right) \quad (3)$$

Thus, the quantity $E_w$ is solely the object emission and thus can be converted into temperature of the object 11'. $E_w$ is determined from processing of the d.c. level and a.c. level of the signals 51 and 53.

The system illustrated by FIGS. 4 and 5 operates well by itself, but can be modified to include insertion in front of the lamp bank 17' and 19' mirrors of the type described for mirrors 33 and 35 of FIG. 1. Such a configuration combines the advantages of both specific embodiments.

Referring to FIG. 6, a modification of the FIG. 4 embodiment is shown. Here, the lightpipes 25" and 43' are positioned outside of the enclosure 13".

Although the various aspects of the present invention have been described with respect to their preferred embodiments, it will be understood that the invention is entitled to protection within the full scope of the appended claims.

It is claimed:

1. A non-contact method of determining a characteristic of a surface of an object, comprising the steps of:
   directing against said object surface incident electromagnetic radiation having a time varying component, wherein a portion of said incident radiation is reflected from said object surface with such a time varying component,
   detecting as a first signal a combined level of said reflected portion of the incident electromagnetic radiation and electromagnetic radiation that is emitted from said object surface,
   detecting as a second signal a level of the incident electromagnetic radiation that is being directed against said object surface,
   determining a magnitude of a time varying component in each of said first and second signals that is the result of said incident radiation time varying component, and
   combining at least the time varying component magnitudes of said first and second signals in a manner to obtain said object surface characteristic.

2. In a process of heating an object by directing electromagnetic radiation within a defined bandwidth against at least one surface of the object from lamps energized by alternating current, wherein an intensity of the lamp radiation includes a time varying component, a method of determining a thermal characteristic of said object surface, comprising the steps of:
   detecting as a first signal a combined level of radiation emitted from said object surface within a predetermined bandwidth and a portion of said lamp radiation within said predetermined bandwidth that is reflected from said object surface, said predetermined bandwidth overlapping said defined source bandwidth,
   detecting as a second signal a level of lamp radiation that is being directed within said defined bandwidth against said object surface,
   determining a magnitude of a time varying component in each of said first and second signals that is the result of said source time varying component, and
   combining at least the time varying component magnitudes of said first and second signals in a manner to obtain said object surface thermal characteristic.

3. The method according to claim 1 wherein the combining step includes taking a ratio of the time varying component magnitudes of said first and second signals.

4. The method according to claim 1 wherein the surface characteristic being obtained is its reflectivity.

5. The method according to claim 2 wherein the combining step includes taking a ratio of the time varying component magnitudes of said first and second signals.

6. The method according to either of claim 3 or 5 wherein the combining step includes the further step of subtracting said ratio from one, thereby determining a quantity related to emissivity of the object surface.

7. The method according to either of claims 3 or 5 wherein the combining step includes the additional steps of multiplying said ratio by one of said first and second signals and then subtracting the result from the other of said first and second signals, thereby determining a quantity related to temperature of the object surface.

8. The method according to either of claims 3 or 5 wherein the combining step includes the additional steps of multiplying said ratio by the second signal and then subtracting the result from the first signal.

9. The method according to either of claims 1 or 2 wherein the surface characteristic being obtained is its emissivity.

10. The method according to either of claims 1 or 2 wherein the surface characteristic being obtained is its temperature.

11. The method according to either of claims 1 or 2 wherein the detecting steps are accomplished without contacting the object surface.

12. The method according to either of claims 1 or 2 wherein the predetermined bandwidth is one where the emissivity of the object surface is substantially uniform over a temperature range of interest.

13. The method according to claim 2 wherein the object includes a semiconductor wafer and the predetermined bandwidth includes a 0.95 micron wavelength.

14. The method according to claim 13 wherein the wafer is contained in a chamber having a substantially transparent wall through which the lamp radiation is passed from outside of the chamber.

15. The method according to claim 14 wherein the transparent wall includes quartz.

16. The method according to claim 14 wherein the detecting steps each includes positioning an end of a light pipe within the chamber between the transparent wall and the wafer in the path of the lamp radiation and extending the light pipe outside of the chamber to a photodetector.

17. The method according to claim 14 wherein the detecting steps each include positioning an end of a light pipe outside of the chamber between the transparent wall and the lamps in the path of the lamp radiation.

18. The method according to either of claims 16 or 17 wherein the light pipes used in the detecting steps are either sapphire or cubic zirconia material.

19. In a system for heating an article within a chamber having a substantially electromagnetic radiation of a given wall thereof by directing electromagnetic radiation of a given bandwidth through said window from outside of said chamber and against the object from a radiation source that also has a time varying intensity component, an improvement adapted to measure the temperature and/or emissivity of said article, comprising:

first and second photodetectors, each of said photodetectors being characterized by generating an electrical signal proportional to a level of electromagnetic radiation incident thereon that includes said time varying intensity radiation component, means positioned with respect to the article for carrying to the first photodetector both a portion of source electromagnetic radiation reflected from said article surface area and electromagnetic radiation emitted by said article surface area within the bandwidth of the source electromagnetic radiation, thereby to generate a first electrical signal that contains a first time varying component, means positioned with respect to the source for carrying to the second photodetector a portion of source electromagnetic radiation substantially without any radiation reflected or emitted from said article surface, thereby to generate a second electrical signal that contains a second time varying component, and means receiving said first and second electrical signals for determining the temperature and/or emissivity of the object surface by at least combining magnitudes of the first and second electrical signal time varying components.

20. The system of claim 19 wherein said first and second photodetectors are positioned outside of said chamber, and wherein said first and second photodetector radiation carrying means include respective first and second light pipes that each have one end thereof positioned within said chamber.

21. The system of claim 19 wherein said first and second photodetector radiation carrying means include respective first and second light pipes that each have a light gathering end thereof positioned outside said chamber.

22. The system of either of claims 20 or 21 wherein said first and second light pipes are made substantially entirely of either sapphire or cubic zirconia material.

23. The system of claim 19 wherein said radiation source includes a lamp energized by alternating current electrical power having a given line frequency.

24. A non-contact method of measuring the emissivity of an object being heated by a plurality of lamps energized by an alternating current power source and having radiation therefrom directed against a surface of the object and having a wavelength range within a visible or near visible portion of the electromagnetic radiation spectrum, comprising the steps of:

detecting a combined level of electromagnetic radiation emitted from said object surface within a defined radiation bandwidth that lies within said source radiation wavelength range and a portion of said source radiation that is reflected from said object surface, thereby to obtain a first signal proportional to a sum of a level of source radiation reflected from the object and a level of radiation emitted from the object, detecting a level of electromagnetic radiation within said defined bandwidth that is being directed against said object surface, thereby to obtain a second signal proportional to the level of source radiation being directed against the object surface, wherein said first and second signals each have a varying component, and combining said first and second signals by taking a ratio of an amplitude of the varying components of each of the first and second signals and subtracting from one, thereby to determine the emissivity of the heated object.

25. A non-contact method of measuring the temperature of an object being heated by a plurality of lamps energized by an alternating current power source and having radiation therefrom directed against a surface of the object and having a wavelength range within a visible of near visible portion of the electromagnetic radiation spectrum, comprising the steps of:

detecting a combined level of electromagnetic radiation emitted from said object surface within a defined radiation bandwidth that lies within said source radiation wavelength range and a portion of said source radiation that is reflected from said object surface, thereby to obtain a first signal proportional to a sum of a level of source radiation reflected from the object and a level of radiation emitted from the object, detecting a level of electromagnetic radiation within said defined bandwidth that is being directed against said object surface, thereby to obtain a second signal proportion to the level of source radiation being directed against the object surface wherein said first and second signals each have a varying component, and combining said first and second signals by executing the following steps:

taking a ratio of an amplitude of the varying components of each of the first and second signals, multiplying that ratio by a value of the second signal, thereby to determine an amount of the first signal that is due to reflected light, and subtracting said amount from said first signal, thereby determining a temperature dependent electromagnetic emission level from the object within said defined radiation bandwidth.

26. The method according to either of claims 24 or 25 wherein the object includes a semiconductor wafer being processed within a furnace chamber.

27. The method according to either of claims 24 or 25 wherein said defined radiation bandwidth consists substantially of to include a wavelength range in which the emissivity of the object is substantially uniform over a temperature range of interest.

28. The method according to either of claims 24 or 25 wherein said object is confined within an enclosure having at least an optically transparent wall portion through which said object heating radiation is passed from the source being positioned outside of said enclosure, and wherein each of the steps of detecting a level of electromagnetic radiation includes the steps of positioning within said enclosure a light pipe having one end oriented to receive said electromagnetic radiation, extending said light pipe outside of said enclosure, and positioning a photodetector to receive a radiation signal from another end of the light pipe outside of said enclosure.

29. The method according to either of claims 24 or 25 wherein said object is confined within an enclosure having at least an optically transparent wall portion through which said object heating radiation is passed from the source being positioned outside of said enclosure, and wherein each of the steps of detecting a level of electromagnetic radiation includes the steps of positioning outside of said enclosure a light pipe having one end oriented to receive said electromagnetic radiation and another end optically communicating with a photodetector.

30. The method according to either of claims 14 or 15 wherein at least one of the steps of detecting a level of electromagnetic radiation includes the steps of positioning an optical light pipe made from either sapphire or cubic zirconia with one end thereof oriented to receive said electromagnetic radiation, and positioning a photodetector to receive a radiation signal from an opposite end of said light pipe.

31. A non-contact method of measuring the temperature of a surface of an object, comprising the steps of:
    illuminating said object surface with optical radiation having a magnitude $I_L$ and a ripple component having a magnitude $\Delta I_L$, thereby to cause optical radiation to be reflected from the surface and combined with temperature dependent optical radiation emitted therefrom, said combined optical radiation having a magnitude $I_W$ and a ripple component having a magnitude $\Delta I_W$,
    detecting the magnitude and ripple component of the optical radiation being directed at said object surface,
    detecting the magnitude and ripple component of said combined optical radiation coming from the object surface, and
    combining said magnitude and ripple components substantially according to the following relationship:

$$I_W - I_L \left( \frac{\Delta I_W}{\Delta I_L} \right);$$

thereby to measure the temperature of the object surface.

32. A non-contact method of measuring the emissivity of a surface of an object, comprising the steps of:
    illuminating said object surface with optical radiation having a ripple component with a magnitude $\Delta I_L$, thereby to cause optical radiation to be reflected from the surface and combined with optical radiation emitted therefrom, said combined optical radiation having a ripple component with a magnitude $\Delta I_W$,
    detecting the ripple component of the optical radiation being directed at said object surface,
    detecting the ripple component of said combined optical radiation coming from the object surface, and
    combining said ripple component substantially according to the following relationship:

$$1 - \frac{\Delta I_W}{\Delta I_L};$$

thereby to measure the emissivity of the object surface.

* * * * *

UNITED STATES PATENT AND TRADEMARK OFFICE
CERTIFICATE OF CORRECTION

PATENT NO.   :   5,154,512
DATED        :   OCTOBER 13, 1992
INVENTOR(S)  :   CHARLES W. SCHIETINGER, BRUCE E. ADAMS

It is certified that error appears in the above-identified patent and that said Letters Patent is hereby corrected as shown below:

```
Column 6, line 68, in Claim 19      replace "electromagnetic
                                            radiation of a
                                            given"

with    ---optically
                                            transparent
                                            window in a---

Column 8, line 30, in claim 25      add---,---
                                        after "surface"
```

Signed and Sealed this

Twenty-third Day of November, 1993

Attest:

BRUCE LEHMAN

*Attesting Officer*    Commissioner of Patents and Trademarks